P. P. ADOLPH.
WATER COOLER.
APPLICATION FILED AUG. 31, 1910.
1,005,588.
Patented Oct. 10, 1911.
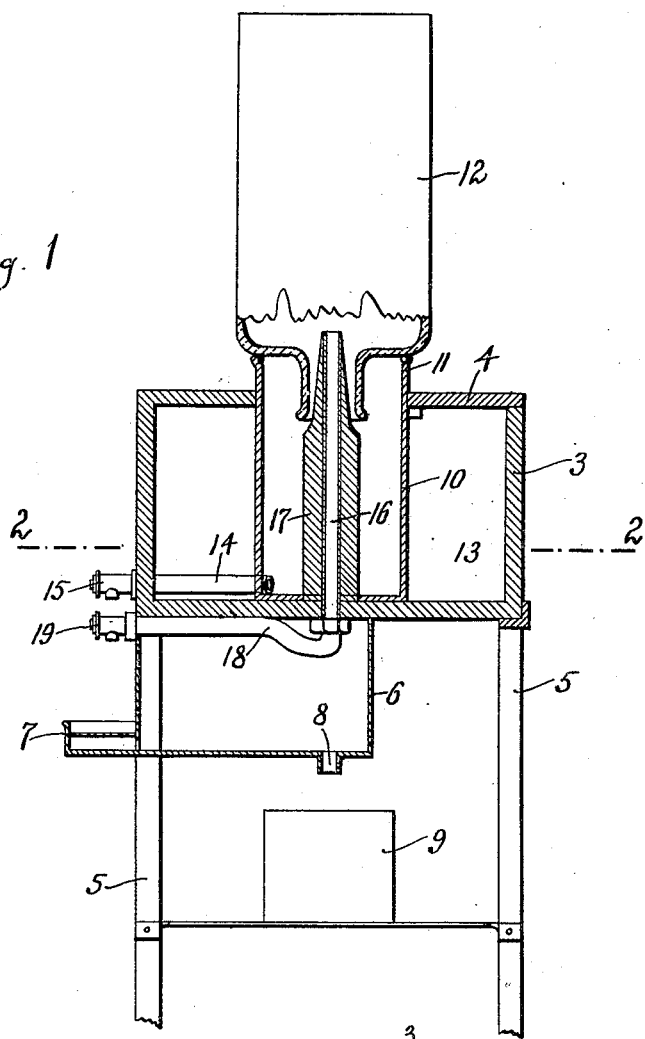
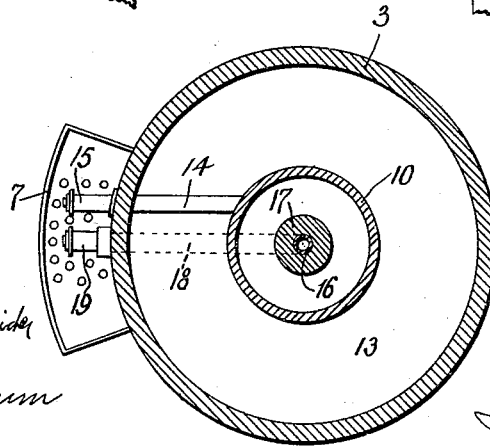
WITNESSES
INVENTOR
Paul P. Adolph
BY
Sigmund Herzog
his ATTORNEY

UNITED STATES PATENT OFFICE.

PAUL P. ADOLPH, OF NEW YORK, N. Y.

WATER-COOLER.

1,005,588.   Specification of Letters Patent.   Patented Oct. 10, 1911.

Application filed August 31, 1910. Serial No. 579,834.

*To all whom it may concern:*

Be it known that I, PAUL P. ADOLPH, a subject of the German Emperor, and a resident of the city of New York, in the county of New York and State of New York, have invented certain new and useful Improvements in Water-Coolers, of which the following is a specification.

The present invention relates to improvements in water coolers, which are provided as their more ordinary use in offices and households for supplying drinking water, which is furnished from time to time as the supply requires replenishment by dealers in such water.

One of the objects of the invention is to provide a simple construction by means of which the water may be drawn off cold from the water cooler, or may be drawn directly from a storage vessel and while being in its still uncooled condition.

With these and other objects in view, which will appear as the nature of the invention is better understood, the same consists in the construction, combination and arrangement of the several parts hereinafter fully described, pointed out in the appended claims and illustrated in the accompanying drawings, it being understood that various changes may be made in the size and proportion of the parts and minor details of construction without departing from the spirit or sacrificing any of the advantages of the invention.

One of the many possible embodiments of the invention is illustrated in the accompanying drawings, in which:—

Figure 1 is a vertical section, partly in elevation, of an apparatus constructed in accordance with the present invention, and Fig. 2 is a section taken on line 2, 2 of Fig. 1.

In the drawings, the numeral 3 indicates a cooler chamber or casing of any suitable shape and size, and of non-conducting material. This casing is provided with a removable cover 4, and is mounted upon legs or standards 5. A waste water receptacle 6 is attached in any suitable manner to the chamber or casing 3, and carries upon it a drinking glass support 7. In the bottom of the receptacle 6 is provided an aperture 8, below which is arranged a receptacle 9 for well known purposes.

In the casing 3 is located a water reservoir 10, open at its upper end, which projects, as shown at 11, above the cover 4 of the chamber 3. The water bottle or other portable storage vessel 12, containing a supply of drinking water, is supported, with its neck projecting into the reservoir 10, by the latter, whereby the water will flow into the reservoir, so that when ice is contained in the annular space 13 between the walls of the reservoir and that of the cooler casing, it will exert its cooling effect through the walls of the reservoir upon the contents of the latter. A pipe 14 leads from the reservoir 10 through the cooler casing 3, and is provided outside of said casing with a faucet or cock 15. A tube 16 leads through the bottoms of the cooler chamber and the reservoir, and projects above the open end of the reservoir 10 into the bottle 12. This tube is covered throughout its length with non-heat-conductive material 17, and is joined outside of the chamber 3 with a pipe 18, upon the end of which is mounted a faucet or cock 19.

The operation of the device is as follows: The bottle is placed upon the reservoir 10, whereby water will flow into the said reservoir and into the tube 16. The water contained in the reservoir will be cooled, and may be drawn off through the faucet 15, if cooled water is desired by the user. If, however, uncooled water is desired, the drinking glass is placed below the faucet 19 and the water drawn off through the latter. This water, coming directly from the bottle 12, is not cooled, obviously, since the non-conducting material 17 prevents the ice from exerting its cooling influence upon the water contained in the tube 16. It will be easily seen that any suitable mixture of cooled and uncooled water may be obtained by drawing from both faucets into the same glass.

It will be observed, that instead of the non-conducting material 17, any other suitable means may be provided for preventing the refrigerant in the cooler chamber from acting upon the water in the tube 16, and the device will still come within the scope of the appended claims.

What I claim is:

1. In a water cooler, the combination with a cooler casing for containing ice or other refrigerating material, of a water reservoir therein, an inverted water bottle supported by and communicating with said reservoir, a faucet arranged outside of said casing, a conduit leading from said reservoir to said faucet, a cock controlled tube leading from the exterior of said casing through said reservoir to the mouth of said bottle and projecting into said bottle, and heat insulating material covering that portion of said tube which is arranged within said reservoir.

2. In a water cooler, the combination with a cooler casing for containing ice or other refrigerating material, of a water reservoir therein, a storage vessel supported by and communicating with said reservoir, a faucet arranged outside of said casing, a conduit leading from said reservoir to said faucet, and a cock controlled tube leading from the exterior of said casing through said reservoir into said storage vessel at or near the bottom of the latter.

3. In a water cooler, the combination with a cooler casing for containing ice or other refrigerating material, of a water reservoir therein, a storage vessel supported by and communicating with said reservoir, a faucet arranged outside of said casing, a conduit leading from said reservoir to said faucet, and a cock controlled tube covered with heat-non-conducting material leading from the exterior of said casing through said reservoir into said storage vessel at or near the bottom of the latter.

Signed at New York, in the county of New York and State of New York, this 8th day of August, A. D. 1910.

PAUL P. ADOLPH.

Witnesses:
SIGMUND HERZOG,
S. BIRNBAUM.

---

Copies of this patent may be obtained for five cents each, by addressing the "Commissioner of Patents, Washington, D. C."